(12) United States Patent
Van Camp et al.

(10) Patent No.: US 9,785,133 B2
(45) Date of Patent: Oct. 10, 2017

(54) METHODS FOR COLLABORATIVELY ASSISTING A CONTROL ROOM OPERATOR

(75) Inventors: Kim Ordean Van Camp, Georgetown, TX (US); Adam Lund, Minneapolis, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 822 days.

(21) Appl. No.: 13/371,267

(22) Filed: Feb. 10, 2012

(65) Prior Publication Data

US 2013/0212186 A1 Aug. 15, 2013

(51) Int. Cl.
*G06F 15/16* (2006.01)
*G05B 19/042* (2006.01)

(52) U.S. Cl.
CPC .. *G05B 19/042* (2013.01); *G05B 2219/23406* (2013.01); *G05B 2219/24012* (2013.01); *G05B 2219/35495* (2013.01)

(58) Field of Classification Search
CPC ... H04L 51/04; H04L 12/587; H04L 12/5855; H04L 51/24; H04L 12/18; H04L 51/10; H04L 2001/0093; H04L 51/20; H04L 51/32; H04L 51/38; H04L 12/1895; H04L 12/581; H04L 12/58
USPC ...................................................... 709/206
See application file for complete search history.

(56) References Cited

U.S. PATENT DOCUMENTS

| | | | |
|---|---|---|---|
| 6,415,290 B1* | 7/2002 | Botts et al. | 707/709 |
| 6,463,348 B1 | 10/2002 | Takechi et al. | |
| 7,103,427 B2* | 9/2006 | Dillon | 700/83 |
| 7,139,560 B2* | 11/2006 | Kulseth et al. | 455/420 |
| 7,228,121 B2* | 6/2007 | Kennedy | 455/404.1 |
| 7,895,330 B2* | 2/2011 | Evanchik et al. | 709/226 |
| 8,107,978 B2* | 1/2012 | Anderl et al. | 455/466 |
| 8,188,870 B2* | 5/2012 | Kumar et al. | 340/576 |
| 2002/0123856 A1* | 9/2002 | Eryurek | 702/140 |

(Continued)

FOREIGN PATENT DOCUMENTS

| | | |
|---|---|---|
| CN | 1557665 | 12/2004 |
| CN | 1980194 | 6/2007 |

(Continued)

OTHER PUBLICATIONS

European Patent Office, "Extended Search Report", issued in connection with European Patent Application No. 13154846.3, issued on Feb. 4, 2015, 9 pages.

(Continued)

*Primary Examiner* — SM Rahman
(74) *Attorney, Agent, or Firm* — Hanley, Flight & Zimmerman, LLC

(57) ABSTRACT

Methods for collaboratively assisting a control room operator are disclosed. An example method disclosed includes receiving a notification associated with a person via a portable wireless device. The notification includes information regarding a process control variable in a process control environment. The example method further includes altering the notification by the person via the portable wireless device and transmitting the altered notification via the portable wireless device. The control room operator and other persons associated with the notification are to receive the altered notification.

20 Claims, 5 Drawing Sheets

(56) References Cited

U.S. PATENT DOCUMENTS

| | | | |
|---|---|---|---|
| 2003/0149598 A1* | 8/2003 | Santoso et al. | 705/2 |
| 2004/0172147 A1* | 9/2004 | Dillon | 700/90 |
| 2005/0007249 A1* | 1/2005 | Eryurek et al. | 340/511 |
| 2007/0133763 A1* | 6/2007 | D'Angelo | G06Q 30/04 379/93.02 |
| 2007/0220553 A1* | 9/2007 | Branam et al. | 725/46 |
| 2008/0028371 A1* | 1/2008 | Brothers et al. | 717/136 |
| 2008/0224856 A1* | 9/2008 | Verma et al. | 340/539.14 |
| 2008/0268817 A1* | 10/2008 | Anderl et al. | 455/412.2 |
| 2009/0065578 A1* | 3/2009 | Peterson et al. | 235/382 |
| 2009/0077055 A1 | 3/2009 | Dillon et al. | |
| 2009/0102644 A1* | 4/2009 | Hayden | G08B 27/003 340/540 |
| 2009/0183208 A1* | 7/2009 | Christensen et al. | 725/58 |
| 2010/0198963 A1* | 8/2010 | Conneely et al. | 709/224 |
| 2010/0217614 A1* | 8/2010 | Brown et al. | 705/1.1 |
| 2011/0040915 A1* | 2/2011 | Strauss | G06F 9/4818 710/267 |
| 2011/0144777 A1* | 6/2011 | Firkins et al. | 700/80 |
| 2012/0117542 A1* | 5/2012 | Bates | 717/125 |
| 2012/0158860 A1* | 6/2012 | Chakra et al. | 709/206 |
| 2013/0046635 A1* | 2/2013 | Grigg et al. | 705/14.58 |
| 2013/0102298 A1* | 4/2013 | Goodman et al. | 455/417 |

FOREIGN PATENT DOCUMENTS

| | | |
|---|---|---|
| CN | 101436070 | 5/2009 |
| CN | 102200769 | 9/2011 |
| JP | 2002149233 | 5/2002 |
| JP | 2005102239 | 4/2005 |
| JP | 2006202084 | 8/2006 |
| JP | 2008512983 | 4/2008 |
| JP | 2008251030 | 10/2008 |
| JP | 2010539596 | 12/2010 |
| WO | 2006031792 | 3/2006 |
| WO | 2007066166 A1 | 6/2007 |
| WO | 2011120625 A1 | 10/2011 |
| WO | WO 2011120625 A1 * | 10/2011 |

OTHER PUBLICATIONS

Japanese Patent Office, "Notice of Reasons for Rejection," issued in connection with Japanese Patent Application No. 2013-022325, mailed Jan. 24, 2017, 4 pages.

State Intellectual Property Office of China, "Notification of the 2nd Office Action," issued in connection with Chinese Patent Application No. 201310064873.4, dated Feb. 28, 2017, 14 pages.

State Intellectual Property Office of China, "Notification of the First Office Action," issued in connection with Chinese Patent Application No. 201310064873.4, dated Jul. 5, 2016, 26 pages.

State Intellectual Property Office of China, "Decision of Rejection," issued in connection with Chinese atent Application No. 201310064873.4, dated Jul. 5, 2017, 25 pages.

\* cited by examiner

METHODS FOR COLLABORATIVELY ASSISTING A CONTROL ROOM OPERATOR

FIELD OF THE DISCLOSURE

This disclosure relates generally to process control environments and, more particularly, to methods for collaboratively assisting a control room operator.

BACKGROUND

Generally, an operator in a control room in a process control plant monitors the current operating states of the process control plant. Often, notifications such as alarms are displayed in the control room. Persons outside of the control room are often interested in the notifications. To apprise these persons of the notifications, notification systems utilizing user profiles are often employed. The user profiles typically include information such as contact information (e.g., email, phone number, etc.), work schedules, vacation exceptions, scope of interest (e.g., machinery reliability, safety concerns, etc.), after-hours availability, and/or other information. After one of the notifications is generated, the persons who are determined to be available to respond to the notification are typically sent an automated message (e.g., text message, email). Generally, in response to the automated message, the persons travel to the control room and/or call or radio the control room operator to assist the control room operator.

SUMMARY

An example method for collaboratively assisting a control room operator includes transmitting a notification to portable wireless devices assigned to persons associated with the notification. The notification includes information regarding a process control variable in a process control environment. The example method further includes altering the notification by one of the persons via one of the portable wireless devices assigned to the one of the persons and distributing the altered notification to the control room operator and the portable wireless devices assigned to the other persons.

Another example method for collaboratively assisting a control room operator includes receiving a notification associated with a person via a portable wireless device. The notification includes information regarding a process control variable in a process control environment. The example method further includes altering the notification by the person via the portable wireless device and transmitting the altered notification via the portable wireless device. The control room operator and the other persons associated with the notification are to receive the altered notification.

Another example method for collaboratively assisting a control room operator includes transmitting a notification to portable wireless devices assigned to persons associated with the notification. The notification includes information regarding a process control variable in a process control environment. The example method further includes receiving an altered notification via one of the portable wireless devices assigned to one of the persons associated with the notification and displaying the altered notification in the process control environment to assist the control room operator.

DETAILED DESCRIPTION

Process control environments typically include input and output devices such as valves, switches, and sensors, which communicate with one or more process controllers. Generally, an operator in a control room in a process control environment monitors current operating states of processes in the process control environment. The operator is often provided with displays that display notifications including information regarding process control variables gathered from the output devices and/or controllers. The information is often organized and/or labeled as alarms, alerts, and/or prompts to notify the operator of potential problems regarding the processes. The operator in the control room may use the information to take a variety of actions such as changing a current state of one or more of the processes.

Persons other than the control room operator such as engineers, operations managers, technicians, safety compliance specialists, and/or other persons are often interested in the notifications. However, the persons are often located outside of the control room and/or the process control environment and, thus, may not have convenient and/or timely access to the displays in the control room.

Example methods disclosed herein enable persons located outside of a control room and/or a process control environment to be apprised of information regarding process control variables in the process control environment and collaboratively assist a control room operator. The example methods disclosed herein include transmitting a notification to a portable wireless device assigned to persons associated with the notification. The notification includes information regarding a process control variable in the process control environment such as, for example, alarm information. The example methods disclosed herein further include altering the notification by one of the persons via one of the portable wireless devices assigned to the one of the persons and distributing the altered notification to the control room operator and the portable wireless devices assigned to the other persons. Some example methods disclosed herein include displaying the altered notification to assist the control room operator. In some examples, the altered notification includes an acknowledgment of the notification by the one of the persons, a text annotation by the one of the persons, and/or a file including an image, a video, or an audio recording.

Figure 1:
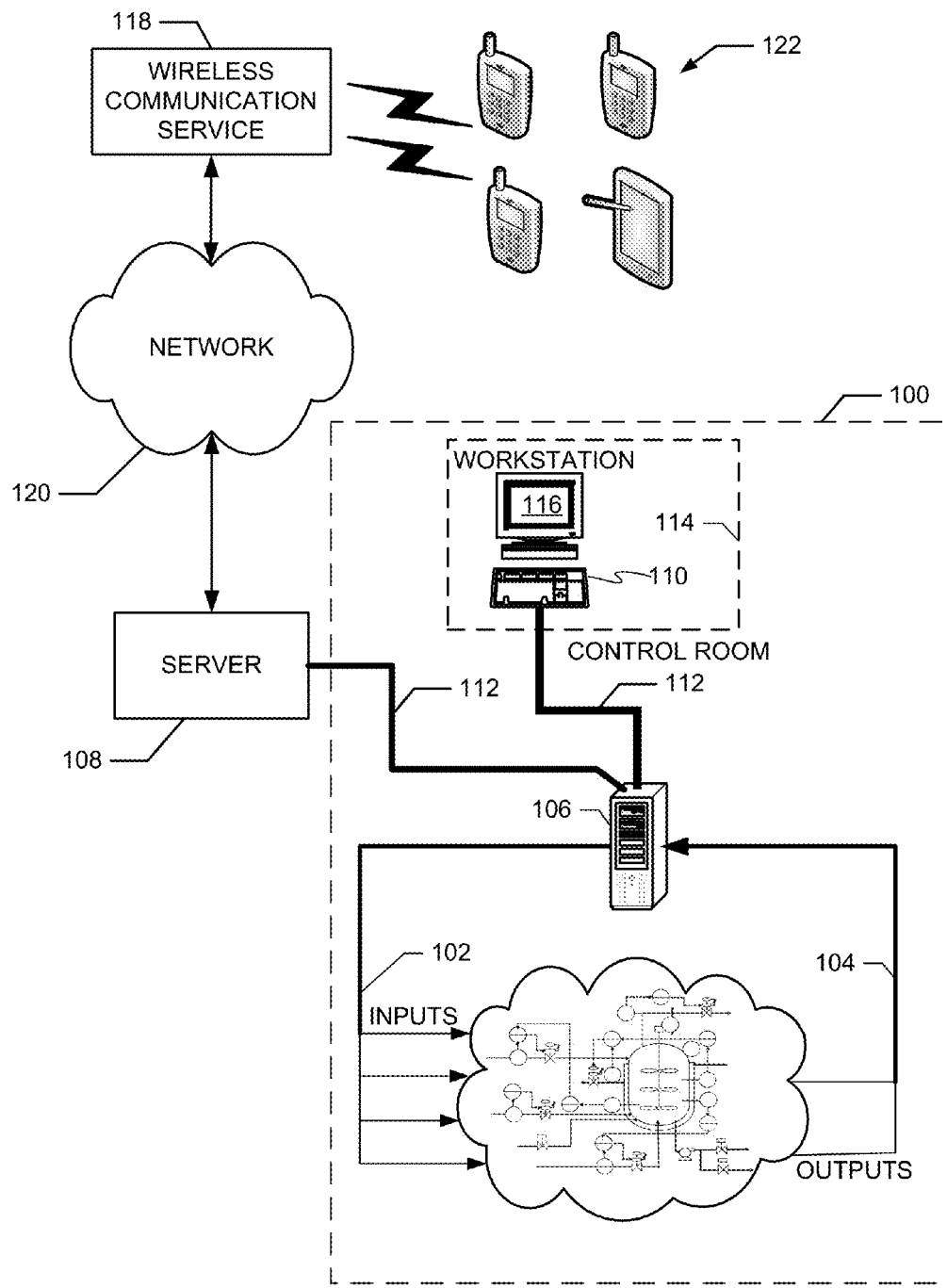
FIG. 1 illustrates an example process control environment that may be used to implement the example methods disclosed herein.

FIG. 1 illustrates an example process control environment 100 that may be used to implement example methods disclosed herein. The example process control environment 100 includes input devices capable of receiving inputs 102 to control a process via, for example, valves, pumps, fans, heaters, coolers, and/or other devices. The example process control environment 100 also includes output devices capable of generating outputs 104 such as, for example, thermometers, pressure gauges, flow meters, and/or other devices. The input devices and output devices are communicatively coupled to a controller 106 (e.g., a DeltaV™ controller), which collects information output by the output devices and transmits instructions to the input devices to cause changes to the process. The information collected by the controller 106 includes, for example, process information, environmental information, and values of process variables (e.g., measured process variables such as, for example, reactor inlet pressure). Some example process control environments include a plurality of controllers. The controller 106 generates notifications based on the information output to the controller 106. Example notifications include information regarding process control variables such as, for example, names of process control variables, current values and/or states of the process control variables, past values and/or states of the process control variables, graphical trend information, location of the process control variables in the process control environment 100, event history (i.e., prior operator actions), and/or other information. Some example notifications include, for example, alarm information, alert information, and/or prompt information. In such examples, the example notifications include, for example, probable causes, recommended actions, and consequences of inaction. In some examples, the notifications are categorized and/or labeled. For example, notifications requiring immediate operator response may be categorized and/or labeled as alarms. In some examples, the labels are indicated visually (e.g., a red outline, blinking, text, etc.).

A server 108 and a workstation 110 are communicatively coupled to the controller 106 via an information bus or a local area network (LAN) 112. In some examples, the workstation 110 is located in a control room 114. The workstation 110 includes a display 116 to display the notifications and/or other information. The server 108 is communicatively coupled to a wireless communication service 118 via a network 120 such as, for example, the internet to transmit notifications to portable wireless devices 122 such as, for example, 475 Field Communicators of Emerson Process Management, smartphones, tablets, and/or other portable wireless devices. The server 108 also receives altered notifications from the portable wireless devices 122 via the wireless communication service 118 and the network 120. As described in greater detail below, the portable wireless devices 122 enable persons to view the notifications and collaboratively assist the control room operator.

In the example process control environment 100 illustrated in FIG. 1, the notifications generated by the controller 106 and/or other information are transmitted to the workstation 110 and the server 108. The server 108 stores the notifications and/or other information. Each of the portable wireless devices 122 includes a software program such as, for example, a web application, which provides an interface (FIG. 2) to view and alter the notifications. The software program may be privately downloadable. In some examples, the software program runs on the server 108.

Each portable wireless device 122 transmits an identification to the server 108 via, for example, the wireless communication service 118 and the network 120. If the server 108 recognizes the identification of one of the portable wireless devices 122 and determines that the portable wireless device 122 is authorized to receive the notifications, the server 108 transmits the notifications to the portable wireless device 122. In some examples, the server 108 transmits the notifications to the portable wireless device 122 without receiving a request for the notifications from the portable wireless device 122 (i.e., the server 108 pushes the notifications to the portable wireless device 122). In other examples, the portable wireless device 122 sends a request for the notifications to the server 108, and the server 108 transmits the notifications to the portable wireless device 122 in response to the request (i.e., the portable wireless device 122 polls the server 108). The portable wireless device 122 receives the notifications, and the notifications are displayed on the portable wireless device 122 via the interface (FIG. 2) provided by the software program.

In some examples, only notifications associated with the person assigned to the portable wireless device 122 are transmitted to the portable wireless device 122. In such examples, each of the notifications is associated with at least one of the persons using criteria such as, for example, type of control process variable, supervisory responsibility, expertise, and/or any other criteria. Thus, when the server 108 recognizes the identification of the portable wireless device 122, the server 108 transmits only the notifications associated with the person to the portable wireless device 122 assigned to the person. As described in greater detail below, the person may alter the notifications via the portable wireless device 122 to collaboratively assist the control room operator.

In some examples, the notifications are transmitted to the portable wireless devices 122 based on locations of the portable wireless devices 122. Some or all of the portable wireless devices 122 include a global positioning system (GPS) receiver and/or other device(s) to determine the location of the portable wireless device 122. When the GPS receiver and/or other device(s) determine the location of one of the portable wireless device 122, the portable wireless device 122 transmits the location to the server 108. Based on the location, the wireless communication service 118 and/or the server 108 enables or disables the notifications to be transmitted to the portable wireless device 122. For example, the notifications may be transmitted from the server 108 to the portable wireless device 122 via the wireless communication service 118 only if the portable wireless device 122 is less than about one mile away from the process control environment 100.

Figure 2:
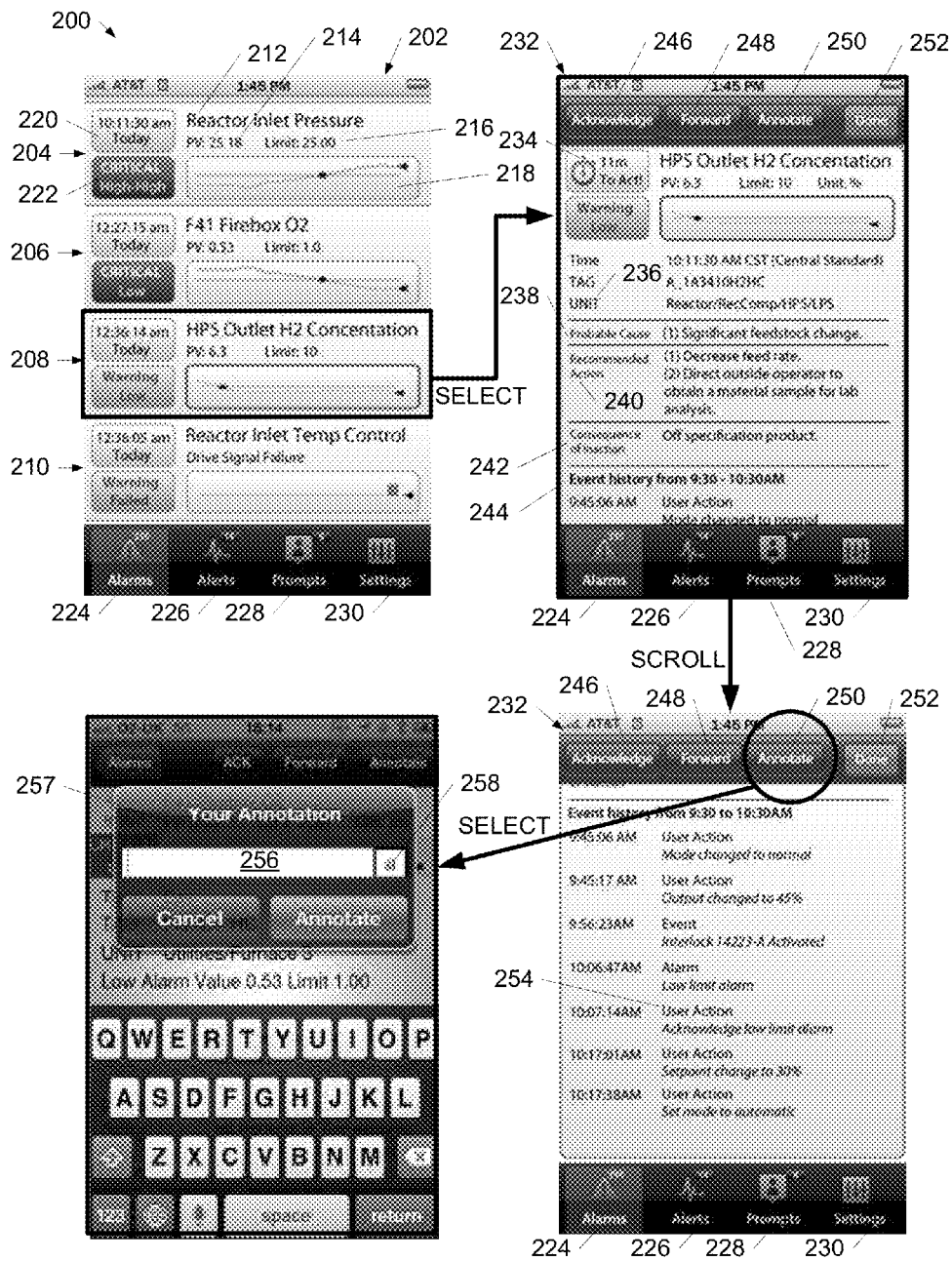
FIG. 2 illustrates an example interface that may be used to implement the example methods disclosed herein.

FIG. 2 illustrates an example interface 200 displayed on one of the portable wireless devices 122 assigned to one of the persons. In the illustrated example, the interface 200 is provided by a web application. The person accesses the web application by selecting an icon (not shown) for the web application. After selecting the icon, a table view screen 202 is displayed.

The example table view screen 202 depicted in FIG. 2 lists example notifications 204, 206, 208 and 210. The example notifications 204, 206, 208 and 210 include alarm information such as, for example, a name 212 of a process control variable, a value 214 of the process control variable, an upper and/or lower limit 216 of the process control variable, graphical trend information 218, a time 220 of the notification, a state 222 of the process control variable (e.g., "CRITICAL High-High," "CRITICAL Low," "Warning Low," "Warning Failed," etc.), and/or other information. In some examples, the notifications 204, 206, 208 and 210 listed on the table view screen 202 include other and/or additional process control information. In some examples, the notifications 204, 206, 208 and 210 are listed according to the state 222 of the process control variables (e.g., by urgency). In some examples, the notifications 204, 206, 208 and 210 displayed on the table view screen 202 blink and/or are highlighted and/or outlined based on the state 222 of the process control variable (e.g., critical alarms may be outlined in red).

Buttons 224, 226, 228, and 230 are disposed along the bottom of the table view screen 202 in the orientation of FIG. 2. In some examples, the notifications are categorized and/or labeled as alarms. In the illustration of FIG. 2, the button 224 labeled "Alarms" is selected to list the example notifications 204, 206, 208 and 210, which are labeled as alarms. The person may view a list of other notifications by selecting one of the other buttons 226 and 228.

One of the buttons 230 positioned along the bottom of the table view screen 202 in the orientation of FIG. 2 is labeled "Settings." When the person selects the "Settings" button 230, the person may view, adjust, and/or change settings of the web application such as, for example, the rate at which the portable wireless device 122 polls the server 108 for notifications (e.g., once every fifteen seconds). In some examples, the portable wireless device 122 polls the server 108 for notifications when the web application is accessed and when the web application is not being accessed. The person may, for example, adjust and/or change when the portable wireless device 122 polls the server 108 for notifications (e.g., when the web application is being accessed and/or when the web application is not being accessed).

In some examples, the person may filter which notifications are listed on the table view screen 202. For example, the person may filter out notifications labeled as alerts and/or prompts to cause the table view screen 202 to list only notifications labeled as alarms. In some examples, the portable wireless device 122 provides a signal indicating receipt of one of the notifications such as, for example, a pop-up message, a vibration, a noise, and/or any other suitable signal. In some examples, the type and/or form of the signal is associated with the information included in the notification. For example, the person may change and/or adjust the type and/or form of the signal or disable the signal based on the label of the notification and/or any other suitable criteria. If desired, the portable wireless device 122 may be set to ring when the portable wireless device 122 receives a notification labeled as an alarm and vibrate when the portable wireless device 122 receives a notification labeled as an alert. The signal may be changed and/or adjusted or disabled based on whether the web application is accessed when the portable wireless device 122 receives the notification. For example, the portable wireless device 122 may be set to provide the signal only for the notifications labeled as alarms when the web application is not being accessed.

The person can view additional information regarding one of the notifications 204, 206, 208 and 210 displayed on the example table view screen 202 by selecting one of the notifications 204, 206, 208 and 210 on the table view screen 202. After selecting the one of the example notifications 208 on the table view screen 202, a detailed view screen 232 is displayed. The example detailed view screen 232 depicted in FIG. 2 displays some or all of the information provided in the example table view screen 202 and/or additional information regarding the example notification 208 such as, for example, time to act 234, a unit 236 where the value of the process control variable is measured, a probable cause 238, a recommended action 240, a consequence of inaction 242, an event history 244, and/or other information.

A plurality of buttons 246, 248, 250 and 252 is positioned along the top of the example detailed view screen 232 in the orientation of FIG. 2. The buttons 246, 248, 250 and 252 include an "Acknowledge" button 246, a "Forward" button 248, an "Annotate" button 250, a "Done" button 252, and/or other buttons. The "Acknowledge" button 246 enables the person to alter the notification 208. For example, if a person selects the "Acknowledge" button 246, the information stored in the server 108 is amended via the portable wireless device 122. When the notification 208 is subsequently transmitted from the server 108 to the portable wireless devices 122, the notification 208 includes the amended information. The amended information is listed on the detailed view screen 232 and/or the table view screen 202. In some examples, the notification 208 blinks, does not blink, and/or otherwise visually indicates the amended information on the table view screen 202 and/or on the detailed view screen 232. In the example illustrated in FIG. 2, the notification 208 is an altered notification and includes amended information in the detailed view screen 232: a user action 254, "Acknowledge low limit alarm."

The "Annotate" button 250 also enables the person to alter the example notification 208. For example, if the person selects the "Annotate" button 250, the person may alter the notification 208 by inputting a text annotation by typing the text annotation into a text input field 256 of a prompt screen 257. In some examples, the web application limits a length of the text annotation (e.g., to 200 characters). The person may also alter the notification 208 by attaching a file (e.g., JPEG file, GIF file, WAV file, MPEG file, etc.) to the notification 208 via the prompt screen 257. In FIG. 2, the prompt screen 257 includes an attachment button 258. If the person selects the attachment button 258, the person may attach the file to the notification 208. For example, the person may attach a file including an image, video, and/or sound of a pump making a hissing sound. In another example, the person may attach a file including an image of a hopper and a container containing material to be placed in the hopper. Thus, annotations and/or attachments may describe, show, examine, investigate, and/or interview a process control device and/or other component and/or process of the process control system 100 to collaboratively assist the control room operator.

Figure 3:
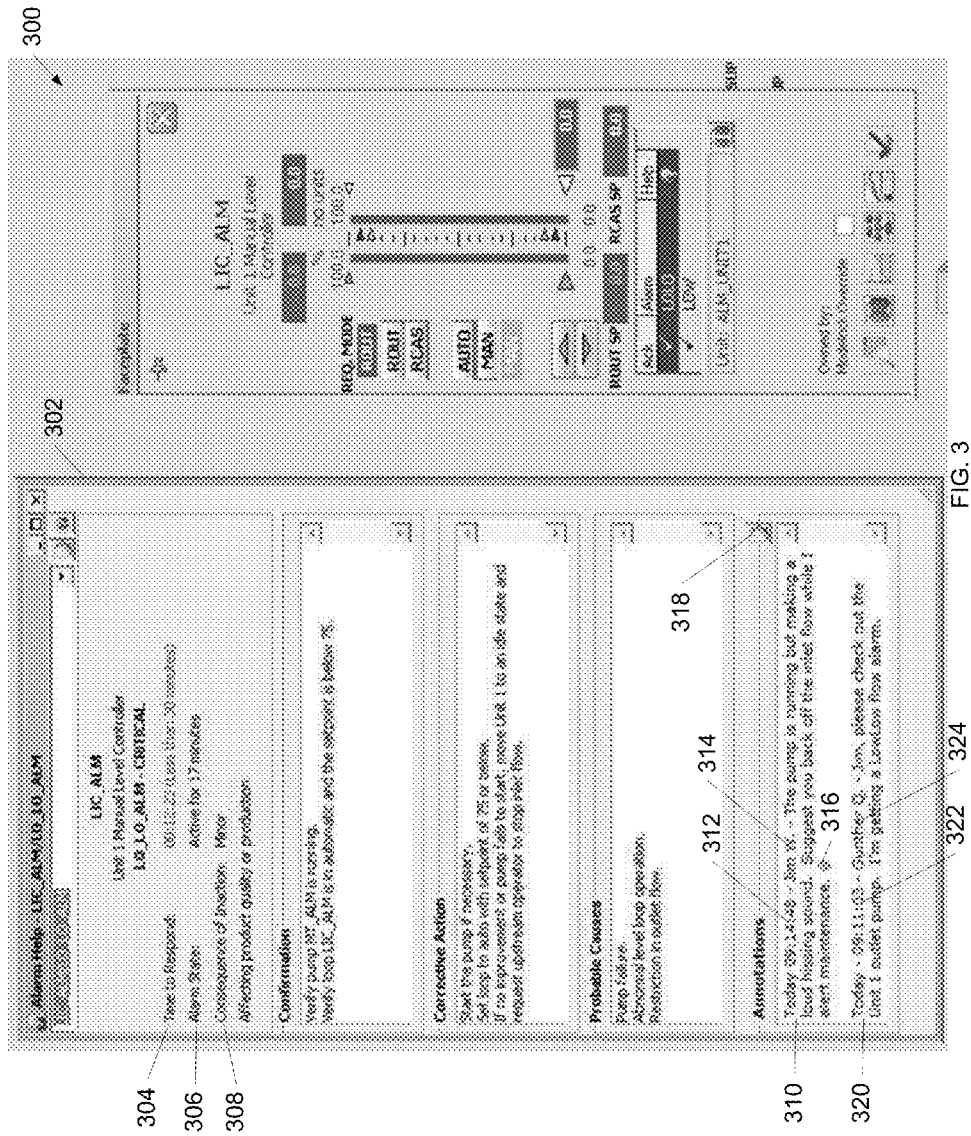
FIG. 3 illustrates an example interface displayed in a process control environment to assist a control room operator.

When a person inputs the text annotation and/or attaches the file, the information stored on the server 108 is amended via the portable wireless device 122 to include the text annotation and/or the file, thereby altering the notification 208. In some examples, when the notification 208 is subsequently transmitted from the server 108 to one of the portable wireless devices 122, the text annotation and/or a link to the file is displayed in the detailed view screen 232. In some examples, the text annotation is automatically stamped with the time when the text annotation is input the portable wireless device 122 (FIG. 3). In some examples, the text annotation is automatically stamped with the name of the person who is assigned to the portable wireless device 122 in which the text annotation is input (FIG. 3). The text annotation and/or the link to the file may be displayed on the table view screen 202 and/or other screens. The portable wireless device 122 may also transmit the location of the portable wireless device 122 to the server 108 when the text annotation is inputted and/or the file is attached.

The "Forward" button 248 enables a person to email the example notification 208 to another person. If the person selects the "Forward" button 248, the portable wireless device 122 generates an email including the notification and/or other information in a body of the email. The person may then edit and/or send the email to other persons. If the person selects the "Done" button 252, the web application displays the table view screen 202. As described in greater detail below, altered notifications are distributed to the control room operator and the portable wireless devices 122 assigned to the other persons.

FIG. 3 depicts an example interface 300 including an altered notification 302 displayed in the process control environment 100 to assist the control room operator. If one of the persons alters a notification such as, for example, one of the notifications 246, 248, 250 and 252 of FIG. 2, the altered notification 302 is distributed to the control room operator. For example, the portable wireless device 122 amends the information on the server 108 to alter the notification, and the altered notification 302 is then transmitted to the controller 106 and displayed in the process control environment 100. The altered notification 302 is displayed on the example interface 300 via, for example, the display 116 of the workstation 110 in the control room 114.

As shown in FIG. 3, the altered notification 302 includes alarm information such as, for example, time to respond 304, alarm state 306, consequence of inaction 308, and/or other alarm information. On the example interface 300 of FIG. 3, the altered notification 302 includes a text annotation 310 inputted by one of the persons associated with the altered notification 302 via the portable wireless device 122 assigned to the person. The example text annotation 310 includes a time stamp 312 and a name 314 of the person who is assigned to the portable wireless device 122. The text annotation 310 also includes a link 316 to an attachment attached to the notification 302 via the portable wireless device 122. If the control room operator selects the link 316, the attachment is displayed via the workstation 110.

The example interface 300 also enables the control room operator to alter the notification 302. The example interface 300 includes a button 318. If the control room operator selects the button 318, the control room operator may alter the notification 302 by, for example, inputting a text annotation via the workstation 110. When the control room operator inputs the text annotation, the information stored on the server 108 is amended via the workstation 110 to include the text annotation, thereby altering the notification 302.

An example text annotation 320 inputted by the control room operator is displayed on the exampled interface 300. The example text annotation 320 includes a time stamp 322 and a name 324 of the control room operator. When the altered notification 302 is subsequently transmitted to the portable wireless devices 122 assigned to the persons associated with the altered notification 302, the text annotation 320 inputted by the control room operator is displayed on the portable wireless devices 122 via the web application (FIG. 2). Thus, the persons associated with the altered notification 302 and the control room operator may alter the notification 302 to collaboratively assist the control room operator.

Figure 4A:
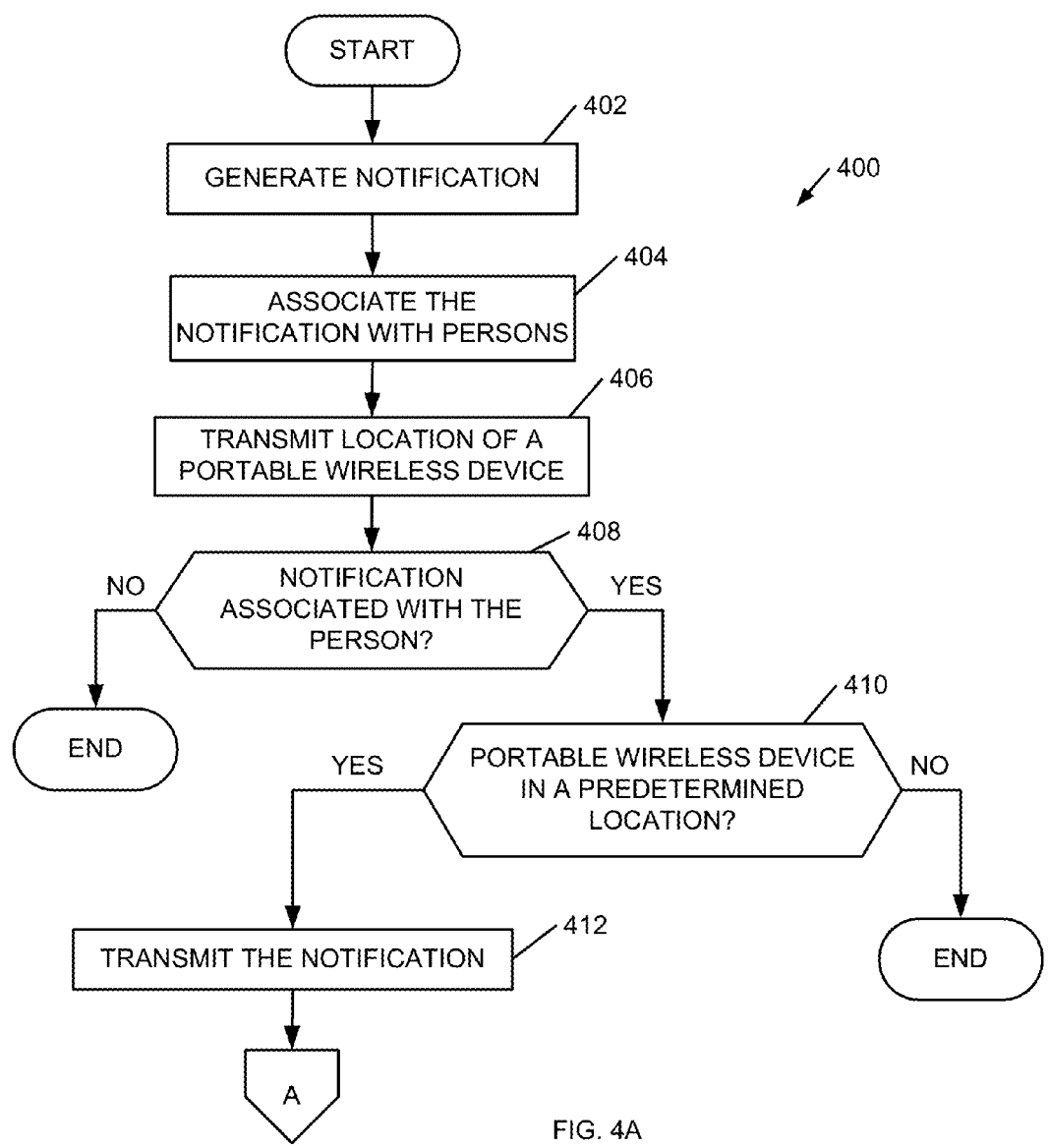
FIGS. 4A-4B is a flow chart representative of an example method disclosed herein.
Figure 4B:
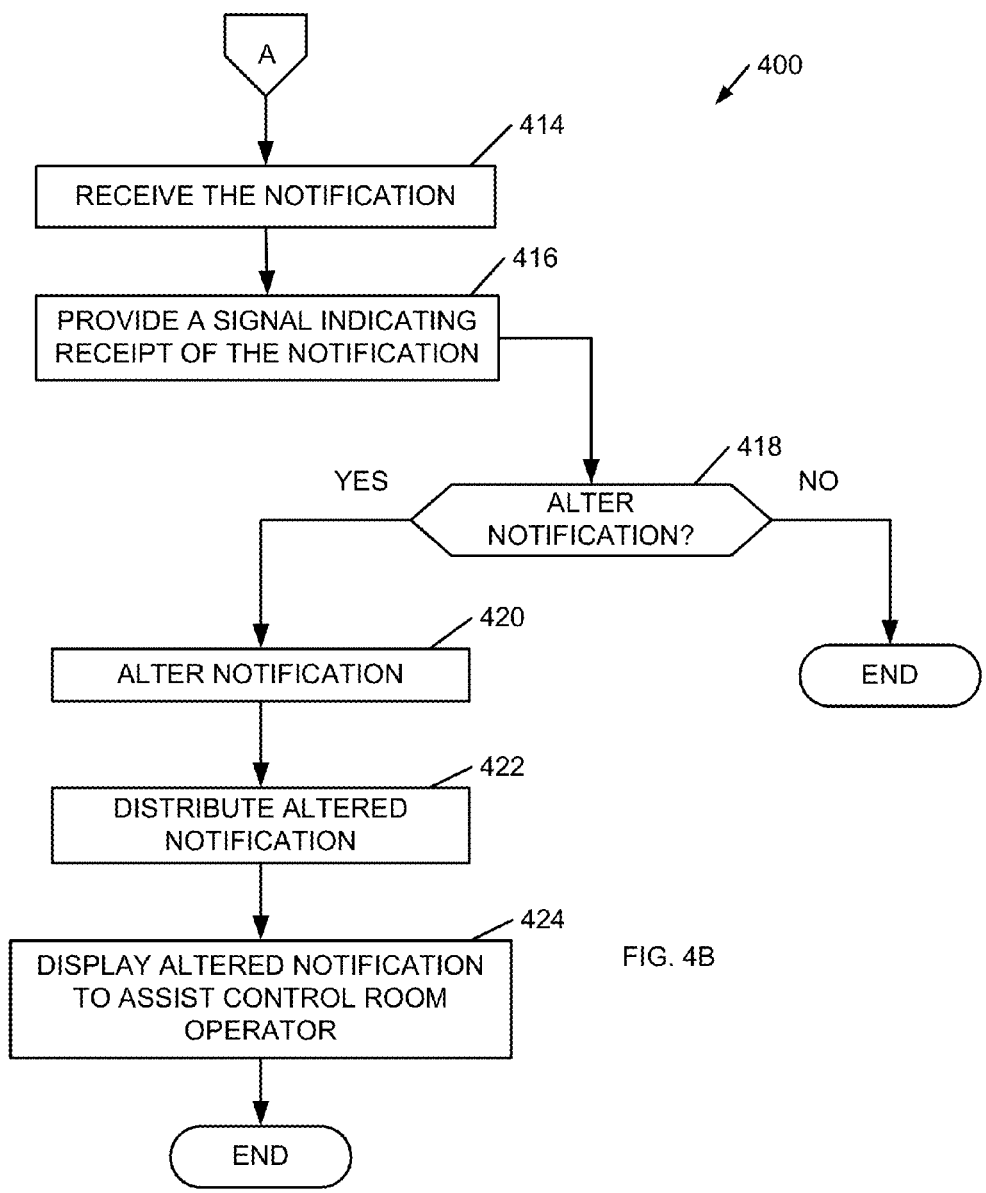

FIGS. 4A-4B is a flowchart representative of an example process or method 400 disclosed that may be used to implement the examples herein. Some or all of the example process 400 of FIGS. 4A-4B may be carried out by a processor, a controller and/or any other suitable processing device. For example, some or all of the example process 400 of FIGS. 4A-4B may be embodied in coded instructions stored on a tangible machine accessible or readable medium such as a flash memory, a ROM and/or random-access memory RAM associated with a processor. Alternatively, some or all of the example process 400 of FIGS. 4A-4B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIGS. 4A-4B may be implemented manually or as any combination of any of the foregoing techniques, for example, any combination of firmware, software, discrete logic and/or hardware. Further, although the example process 400 of FIGS. 4A-4B is described with reference to the flowchart of FIGS. 4A-4B, persons of ordinary skill in the art will readily appreciate that many other methods of implementing the example process 400 of FIGS. 4A-4B may be employed. For example, the order of execution of the blocks may be changed, and/or some of the blocks described may be changed, eliminated, sub-divided, or combined. Additionally, persons of ordinary skill in the art will appreciate that any or all of the example process 400 of FIGS. 4A-4B may be carried out sequentially and/or carried out in parallel by, for example, separate processing threads, processors, devices, discrete logic, circuits, etc.

With reference to FIGS. 1-3, the example method or process 400 of FIGS. 4A-4B begins when a notification is generated by the controller 106 (block 402). The notification includes information regarding the process control variable in the process control environment 100 such as, for example, alarm information, alert information, or prompt information. The controller 106 then associates the notification with persons (block 404). The notification is transmitted to the server 108, and a portable wireless device 122 assigned to one of the persons transmits a location of the portable wireless device 122 to the server 108 (block 406). For example, the portable wireless device 122 transmits the location of the portable wireless device 122 determined by a GPS receiver and/or other device. In some examples, the portable wireless device 122 polls the server 108 for notifications.

At block 408, whether the notification is associated with the person assigned to the portable wireless device 122 is determined (block 408). If the notification is associated with the person assigned to the portable wireless device 122, whether the portable wireless device 122 is in a predetermined location is determined (block 410). For example, the predetermined location may be within one mile of the process control environment 100. If the portable wireless device 122 is in the predetermined location, the notification is transmitted to the portable wireless device 122 (block 412). In some examples, the server 108 pushes notifications to the portable wireless device 122. The portable wireless device 122 receives the notification (block 414) and provides a signal indicating receipt of the notification (block 416). In some examples, the signal is a noise, a vibration, and/or a pop up message.

The person determines whether the notification is to be altered via the portable wireless device 122 (block 418). If the person alters the notification (block 420), the information stored on the server 108 is amended. In some examples, the person alters the notification by inputting a text annotation, attaching a file, and/or selecting the "Acknowledge" button 246 as disclosed above. The altered notification is then distributed to the control room operator and the portable wireless devices 122 assigned to the other persons associated with the altered notification (block 422). For example, the altered notification is transmitted from the server 108 to the portable wireless devices 122 via the network 120 and the wireless communication service 118, and the altered notification is transmitted from the server 108 to the controller 106 via the information bus or the LAN 112. At block 424, the altered notification is displayed to assist the control room operator. In some examples, the altered notification is displayed on the interface 300 via the workstation 110 in the control room 114. The control room operator may also alter the notification by, for example, inputting a text annotation via the workstation 110.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method for collaboratively assisting a control room operator, the method comprising:
   transmitting an initial notification to portable wireless devices assigned to persons associated with the initial notification, the initial notification including information regarding a process control variable in a process control environment monitored by the control room operator;
   altering the initial notification by one of the persons via one of the portable wireless devices assigned to the one of the persons to form an altered notification; and
   distributing the altered notification to the control room operator and the portable wireless devices assigned to the other persons, the altered notification to replace a display of the initial notification to the control room operator.

2. The method of claim 1, wherein the initial notification is transmitted to the portable wireless devices based on locations of the portable wireless devices.

3. The method of claim 1, further comprising providing a signal by each of the portable wireless devices indicating receipt of the initial notification.

4. The method of claim 3, wherein a form of the signal provided by each portable wireless device is associated with the information included in the initial notification.

5. The method of claim 1, wherein the altered notification is displayed to assist the control room operator.

6. The method of claim 1, wherein the altered notification includes a text annotation or a file including an image, a video, or an audio recording.

7. The method of claim 1, wherein the altered notification includes an acknowledgment.

8. The method of claim 1, wherein the information regarding the process control variable includes alarm information, alert information, or prompt information.

9. A method for collaboratively assisting a control room operator, the method comprising:
   receiving an initial notification associated with a person via a portable wireless device, the initial notification including information regarding a process control variable in a process control environment monitored by the control room operator;
   altering the initial notification by the person via the portable wireless device to form an altered notification; and
   transmitting the altered notification via the portable wireless device, wherein the control room operator and other persons associated with the notification are to receive the altered notification, the altered notification to replace a display of the initial notification to the control room operator.

10. The method of claim 9, further comprising providing a signal by the portable wireless device indicating receipt of the initial notification.

11. The method of claim 10, wherein a form of the signal provided by the portable wireless device is associated with the information included in the initial notification.

12. The method of claim 9, further comprising transmitting a location of the portable wireless device via the portable wireless device.

13. The method of claim 9, further comprising filtering the initial notification received via the portable wireless device.

14. The method of claim 9, wherein the altered notification includes a text annotation or a file including an image, a video, or an audio recording.

15. The method of claim 9, wherein the altered notification includes an acknowledgment.

16. The method of claim 9, wherein the information regarding the process control variable includes alarm information, alert information, or prompt information.

17. A method for collaboratively assisting a control room operator, the method comprising:
   transmitting an initial notification to portable wireless devices assigned to persons associated with the initial notification, the initial notification including information regarding a process control variable in a process control environment monitored by the control room operator;
   receiving an altered notification via one of the portable wireless devices assigned to one of the persons associated with the notification, the altered notification including information provided by one of the persons via one of the portable wireless devices; and
   displaying the altered notification in the process control environment to assist the control room operator, the altered notification replacing a display of the initial notification to the control room operator.

18. The method of claim 17, wherein the altered notification includes a text annotation by the one of the persons or a file including an image, a video, or an audio recording.

19. The method of claim 17, wherein the altered notification includes an acknowledgment by the one of the persons.

20. The method of claim 17, wherein the information regarding the process control variable includes alarm information, alert information, or prompt information.

* * * * *